(12) United States Patent
Novak et al.

(10) Patent No.: US 7,089,678 B2
(45) Date of Patent: Aug. 15, 2006

(54) ENCODER WITH REFERENCE MARKS

(75) Inventors: Janez Novak, Ljubljana (SI); Gregor Dolsak, Velike Lasce (SI)

(73) Assignee: Renishaw, PLC, Gloucestershire (GB)

( * ) Notice: Subject to any disclaimer, the term of this patent is extended or adjusted under 35 U.S.C. 154(b) by 43 days.

(21) Appl. No.: 10/500,727

(22) PCT Filed: Jan. 13, 2003

(86) PCT No.: PCT/EP03/00385

§ 371 (c)(1),
(2), (4) Date: Jul. 6, 2004

(87) PCT Pub. No.: WO03/058172

PCT Pub. Date: Jul. 17, 2003

(65) Prior Publication Data

US 2005/0060905 A1    Mar. 24, 2005

(30) Foreign Application Priority Data

Jan. 11, 2002   (GB)   .................. 0200575.9

(51) Int. Cl.
 *G01B 11/02* (2006.01)
(52) U.S. Cl. ........................ 33/706; 33/1 PT
(58) Field of Classification Search .................. 33/706, 33/1 PT, 707, 708, 762, 763
See application file for complete search history.

(56) References Cited

U.S. PATENT DOCUMENTS

| 4,009,377 | A | | 2/1977 | Elms |
| 4,459,750 | A | | 7/1984 | Affa |
| 4,519,140 | A | * | 5/1985 | Schmitt ..................... 33/706 |
| 4,631,519 | A | | 12/1986 | Johnston |
| 5,239,177 | A | * | 8/1993 | Cunniff ................. 250/231.18 |
| 5,279,044 | A | | 1/1994 | Bremer ....................... 33/706 |
| 5,572,009 | A | | 11/1996 | Guertler |
| 5,651,187 | A | * | 7/1997 | Affa ........................... 33/706 |
| 5,998,784 | A | | 12/1999 | Venugopal et al. |
| 6,127,948 | A | | 10/2000 | Hillis et al. |
| 6,158,132 | A | * | 12/2000 | Kofink et al. ............... 33/1 PT |
| 6,541,761 | B1 | * | 4/2003 | Holzapfel et al. ............ 33/707 |
| 2004/0168333 | A1 | * | 9/2004 | Mauerberger et al. ........ 33/707 |

FOREIGN PATENT DOCUMENTS

EP    0 545 701 A1    6/1993

* cited by examiner

*Primary Examiner*—Christopher W. Fulton
(74) *Attorney, Agent, or Firm*—Oliff & Berridge, PLC

(57) ABSTRACT

A scale (10) has magnetic incremental scale marks in a track (10*a*), and a pseudo-random code sequence in a reference mark track (10*b*). Sensors (2,3) feed the pattern of the code in the track (10*b*) into a bi-directional shift register (18). So that a user can select any desired position for use as a reference mark, a memory (24) is provided, into which any selected code value can be pre-stored. A comparator (26) then compares the code value in the shift register (18) with the code value in the memory (24) and outputs a reference mark signal (Ri) when they match.

11 Claims, 4 Drawing Sheets

ENCODER WITH REFERENCE MARKS

FIELD OF THE INVENTION

This invention relates to encoders. It is applicable to both rotary and linear encoders for indicating the position, relative to each other, of two relatively movable members.

DESCRIPTION OF PRIOR ART

Known incremental encoders comprise a scale with regular incremental marks, and a scale reader which is movable along the scale, producing output pulses or cyclic waveforms in response to the incremental marks as they pass. The output is taken to a counter which counts the incremental pulses or cycles thus produced, making it possible to measure the distance travelled.

In an incremental scale, it is known to provide the incremental marks in one track along a scale, and also to provide one or more reference marks (commonly in a parallel track, though it has also been suggested to embed them in the incremental track). The readhead has a suitable detector for detecting the reference mark. By resetting the counter to zero or some other preset value when the reference mark is detected, it is possible for the counter output to indicate an absolute position, e.g. the actual distance from the position of the reference mark.

It can be desirable to have several reference marks in the reference track, and to enable the user to select which of the reference marks to use, i.e. which one is to reset the counter. An example is shown in U.S. Pat. No. 4,459,750 (Affa), where a selector element may be positioned against a chosen reference mark. Problems with this include the fact that the reference marks are necessarily quite widely spaced from each other. Thus, the user does not have a free choice for the precise position of the reference mark, and the readhead may have to be moved a significant distance along the scale before a suitable reference mark is reached. There is also the need to mechanically position the selector element.

Absolute and quasi-absolute encoders are also known, in which information encoding the absolute position along the scale is provided in one or more tracks of the scale. It is known from U.S. Pat. Nos. 4,009,377 (Elms) and 6,127,948 (Hillis et al) that one way to encode the absolute position is to use a pseudo-random code. The pseudo-random code is decoded electronically or in a computer to obtain the absolute position. However, this does not address the provision of a reference mark in the manner discussed above, e.g. for resetting a counter.

SUMMARY OF THE INVENTION

One aspect of the present invention provides an encoder comprising a scale and a scale reader;
  the scale having a plurality of reference marks spaced apart in the lengthways direction;
  the scale reader including a sensor which reads the reference marks;
  characterised in that:
  the reference marks are arranged along the scale in a random or pseudo-random pattern;
  as the scale reader moves over the pattern of the reference marks, the pattern is continually compared with a previously stored pattern; and
  when the pattern of the reference marks matches the previously stored pattern, a reference signal is output.

Another aspect of the present invention provides an encoder comprising a scale and a scale reader;
  the scale having a series of incremental marks extending along its length, and a plurality of reference marks spaced apart in the lengthways direction;
  the scale reader including one or more sensors which read the incremental marks and produce an output therefrom, and which read the reference marks;
  characterised in that:
  the reference marks are arranged along the scale in a random or pseudo-random pattern;
  as the scale reader moves over the pattern of the reference marks, the pattern is continually compared with a previously stored pattern; and
  when the pattern of the reference marks matches the previously stored pattern, a reference signal is output.

The encoder may include a counter which indicates the position of the readhead along the scale, said reference signal being connected to an input of the counter to reset the counter to a preset value, such as zero.

In preferred embodiments, the scale reader reads the pattern of the reference marks into a shift register as it passes over them, and the pattern in the shift register is compared to the previously stored pattern. Values may be introduced into one end of the shift register, depending upon the values received from the pattern of the reference marks, and these values may be shifted along the shift register synchronously with the passing of the scale reader over the reference marks. Preferably values may be introduced into either end of the shift register, depending upon the direction of travel of the scale reader along the scale.

BRIEF DESCRIPTION OF THE DRAWINGS

A preferred embodiment of the invention will now be described by way of example, with reference to the accompanying drawings, wherein.

DESCRIPTION OF PREFERRED EMBODIMENTS

Figure 1:
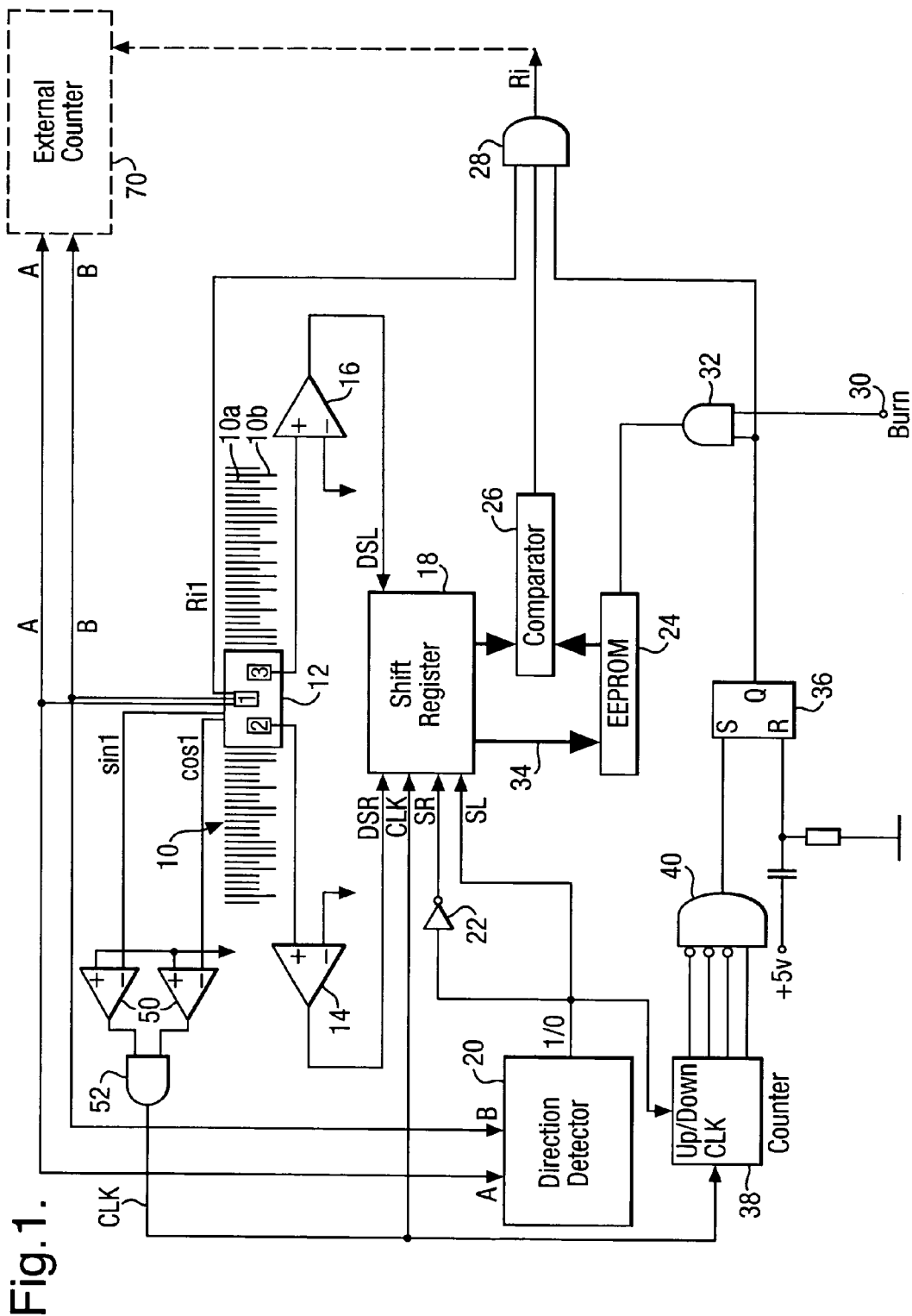
FIG. 1 is a schematic diagram of a first embodiment of an encoder, showing a scale, a readhead and circuitry for producing a reference signal.

FIG. 1 shows an elongate scale 10, along which a scale reader 12 can run. In practice, the scale 10 and scale reader 12 are fixed to respective relatively movable members of a machine, and measure their relative movement.

The scale 10 includes an incremental track 10a, comprising a series of spaced marks which are read by a readhead or sensor 1 in the scale reader 12. In the preferred embodiment, the marks of the incremental track are magnetic marks, spaced for example 1 mm apart, and the readhead 1 is an integrated circuit chip designated POT sold by the present applicants RLS d.o.o., Slovenia.

This chip produces raw sine and cosine outputs (sin1, cos1) from the scale marks. From these it generates quadrature squarewaves on lines A,B, which by interpolation within the chip can be generated at 25 times the pitch of the incremental track 10a. It also generates a reference pulse Ri1 every period of the incremental track, when sin1 equals cos1, and sin1 and cos1 are both greater than zero. This reference pulse has a width corresponding to 10 μm.

An additional clock pulse CLK is derived every period of the incremental track from the outputs sin1, cos1 of the readhead chip 1, by comparators 50 and an AND gate 52.

The POT chip incorporates Hall effect sensors to react to the magnetic scale marks. The technology for producing the signals sin1, cos1, A, B and Ri1 is well-known and will not be described further. Of course, scales with other pitches could be used. Other magnetic readheads could be used instead of the POT chips. The invention is also applicable to scales using technology other than magnetic, e.g. optical scales and opto-electronic scale readers.

The quadrature incremental signals A,B provide the main output of the device, and are taken to an up-down counter 70 in the normal way in order to count the position of the scale reader 12 along the scale 10. In practice, this will usually be provided externally, in the customer's equipment to which the scale and scale reader are to be fitted. The external counter 70 counts the incremental signals A,B to provide an indication of the position of the scale reader relative to the scale. As described below, a signal Ri can reset this counter if the count should become incorrect for any reason.

The scale 10 also includes a coded reference track 10b, alongside the incremental track 10a. As shown, this may be produced simply by extending selected ones of the incremental marks sideways. However, it is possible to provide a separate reference track instead. It is also possible to provide two reference tracks, arranged symmetrically on either side of the incremental track 10a, so that the scale can be fitted either way round in practice.

The magnetic marks in the reference track 10b form a pseudo-random code (also known as a chain code sequence or pseudo-random binary sequence), chosen such that the code only repeats at certain intervals. In a simple 4-bit example, the following code pattern may be used repeatedly:

...0 0 0 0 1 0 0 1 1 0 1 0 1 1 1 1 0 0 0...

(where 1 and 0 represent the presence and absence of a mark).

Each successive 4-bit pattern in this code provides a unique value. There sixteen different values, which repeat every 16 mm if the period of the scale is 1 mm, as follows:

| 0 | 0 | 0 | 0 |
|---|---|---|---|
| 0 | 0 | 0 | 1 |
| 0 | 0 | 1 | 0 |
| 0 | 1 | 0 | 0 |
| 1 | 0 | 0 | 1 |
| 0 | 0 | 1 | 1 |
| 0 | 1 | 1 | 0 |
| 1 | 1 | 0 | 1 |
| 1 | 0 | 1 | 0 |
| 0 | 1 | 0 | 1 |
| 1 | 0 | 1 | 1 |
| 0 | 1 | 1 | 1 |
| 1 | 1 | 1 | 1 |
| 1 | 1 | 1 | 0 |
| 1 | 1 | 0 | 0 |
| 1 | 0 | 0 | 0 |
| 0 | 0 | 0 | 0 |

In practice, it will often be preferable to use a longer pseudo-random code, for example an 8-bit code.

A suitable code pattern for an 8-bit code which repeats only every 256 mm is follows:

...0 1 0 0 0 0 0 0 1 1 0 0 0 0 0 1 0 1 0 0 0 0 0 1 1 1

0 0 0 0 1 0 0 1 0 0 0 0 1 0 1 1 0 0 0 0 1 1 0 1 0 0 0 0

1 1 1 1 0 0 0 1 0 0 0 1 0 0 1 1 0 0 0 1 0 1 0 1 0 0 0 0

0 1 1 1 0 0 0 1 1 0 0 1 0 0 0 1 1 0 1 1 0 0 0 1 1 1 0 1

0 0 0 1 1 1 1 1 0 0 1 0 0 1 0 1 0 0 1 0 0 1 1 1 0 0 1 0

1 0 1 1 0 0 1 0 1 1 0 1 0 0 1 0 1 1 1 1 0 0 1 1 0 0 1 1

0 1 0 1 0 0 1 1 0 1 1 1 0 0 1 1 1 0 1 1 0 0 1 1 1 1 0 1

0 0 1 1 1 1 1 1 0 1 0 1 0 1 0 1 1 1 0 1 0 1 1 0 1 1 0 1

0 1 1 1 1 1 0 1 1 0 1 1 1 1 0 1 1 1 0 1 1 1 1 1 1 1 1 0

0 0 0 0 0 0 ...

In this code sequence, each successive 8-bit pattern provides a unique value. The first few of these values are as follows:

| 0 | 1 | 0 | 0 | 0 | 0 | 0 | 0 |
|---|---|---|---|---|---|---|---|
| 1 | 0 | 0 | 0 | 0 | 0 | 0 | 1 |
| 0 | 0 | 0 | 0 | 0 | 0 | 1 | 1 |
| 0 | 0 | 0 | 0 | 0 | 1 | 1 | 0 |
| 0 | 0 | 0 | 0 | 1 | 1 | 0 | 0 |
| 0 | 0 | 0 | 1 | 1 | 0 | 0 | 0 |
| etc. | | | | | | | |

Even longer codes could be used if greater repeat intervals were needed, e.g. 14 or 15-bit codes. With a greater repeat interval, the user can have a longer length of scale within which it is possible to select a unique code value for the reference.

The coded reference track 10b is read by two readheads or sensors 2,3 within the scale reader 12. For economy, these may be POT chips which are identical with the readhead 1, although this is not essential. A single readhead for the reference track would also be possible, though the reason we use two in the present embodiment will become apparent shortly. The position of readhead chip 1 relative to readhead chips 2 and 3 should be such that the clock signal CLK appears at the time when readhead chips 2 and 3 are sensing the presence of a magnetic mark in the reference track 10b.

Analogue outputs from the POT chips 2,3 are used. These may be the sine or cosine signals, or a reference signal derived from them. The outputs from the chips 2,3 are taken to comparators 14,16, where they are squared up. Thus, each comparator 14,16 provides a digital pulse train, which may be represented as a train of 0s and 1s, corresponding to the code of the marks in the reference track 10b.

As seen in FIG. 1, the pulse trains from the comparators 14,16 are fed to data inputs DSR,DSL at opposite ends of a bi-directional shift register 18. The shift register 18 has as many bits as the number of bits of the pseudo-random code, e.g. 4 bits or 8 bits in the above examples. The shift register 18 is clocked at an input CLK by the reference pulses from the comparators 50 and AND gate 52. Thus, one new data bit is read into one or other end of the shift register for each period of the scale 10, and this data bit will correspond to an 0 or 1 of the pseudo-random code of the reference track 10b.

A direction detector 20 receives the quadrature outputs A,B of the readhead 1, and produces an output which is high or low, depending on the direction of travel of the scale reader 12 along the scale 10. This is taken to a direction input SL and (via an inverter 22) to a complementary direction input SR of the shift register 18, in order to determine the direction in which the data bits are shifted through the shift register. Thus, when the scale reader moves towards the right (as seen in FIG. 1) new data values from the pseudo-random code in the reference track 10b are picked up by the readhead 3 and fed into the shift register 18 from right to left via the input DSL. Conversely, when the scale reader 12 is moving towards the left, new values of the pseudo-random code are fed into the shift register from left to right via the input DSR.

The readheads 2,3 of the scale reader 12 are deliberately spaced apart by a distance corresponding to one word of the pseudo-random code. Thus, for example, in the case of a 4-bit code, and a 1 mm period scale, the readheads 2,3 are spaced apart by 4 mm. In the case of an 8-bit code, and a 1 mm period, they are spaced by 8 mm.

It will be seen that as a result, the bits held in the shift register 18 always correspond to the code bits which are in the reference track 10b between the readheads 2,3, and are continually maintained up to date as the scale reader 12 moves along the scale 10.

The readhead 1 is preferably spaced mid-way between the readheads 2,3 in the scale reader 12. However, this is not essential, as long as the phase of the clock pulse CLK is correct, compared to the readheads 2 and 3, so that the pulses from the code track are correctly sampled by the shift register 18.

When the scale 10 and scale reader 12 are installed on a machine, one particular value of the pseudo-random code will be chosen as a reference value, and as described below is stored in a memory 24. The memory 24 may for example consist of an electrically erasable and programmable read-only memory (EEPROM). A comparator 26 continually compares the outputs of the shift register 18 with the output of the memory 24.

When the scale reader 12 is moved into a position relative to the scale 10 such that the value in the shift register 18 is equal to the value in the memory 24, the comparator 26 provides an output to an AND gate 28. Here, it is ANDed with the 10 μm reference pulse Ri1, producing a 10 μm output Ri. This may be taken to the control system of the machine upon which the scale and scale reader are installed, as a reference pulse, for example in order to reset the external counter 70 which counts the quadrature signals A,B from the incremental track 10a. The counter can thus be reset should it have lost count for any reason, e.g. when the system is first switched on or if there is a power outage or corruption of the incremental signal from the scale.

The manner in which a selected code value is stored in the memory 24 will now be described. The scale reader 12 is moved to a desired position on the scale 10, and an input is then provided to a "burn" input 30, e.g. from a push-button. This is taken via an AND gate 32 to the memory 24, and causes the current value from the shift register 18 to be burnt into the memory 24 via a bus 34.

However, it will be appreciated that if the system has just been switched on, the data in the shift register 18 will not be valid. The scale reader 12 must move by at least the length of the code (e.g. 8 mm in the case of an 8-bit code and a 1 mm scale period) in order for the data to be valid. This condition is indicated by the output of a flip-flop 36, which is reset upon power-up by a capacitor-resistor circuit C,R. In this condition, it inhibits both the AND gate 32 (to prevent invalid data being burnt into the memory 24) and also the AND gate 28 (to prevent an invalid output reference pulse Ri).

The flip-flop 36 is set, enabling the AND gates 32,28, when a counter 38 and gate 40 indicate that the scale reader 12 has moved by a sufficient distance. They do this by counting the clock pulses CLK from the readhead 1.

In a simpler system, the memory 24 could be a DIP switch, having as many as switches as there are bits of the pseudo-random code. The code value at which the reference pulse Ri is to be generated is then set manually on these switches.

The second embodiment of encoder will now be described, with reference to FIGS. 2–4. This embodiment requires only one readhead or sensor for the coded reference marks, instead of the two readheads 2,3 in FIG. 1.

Figure 2:
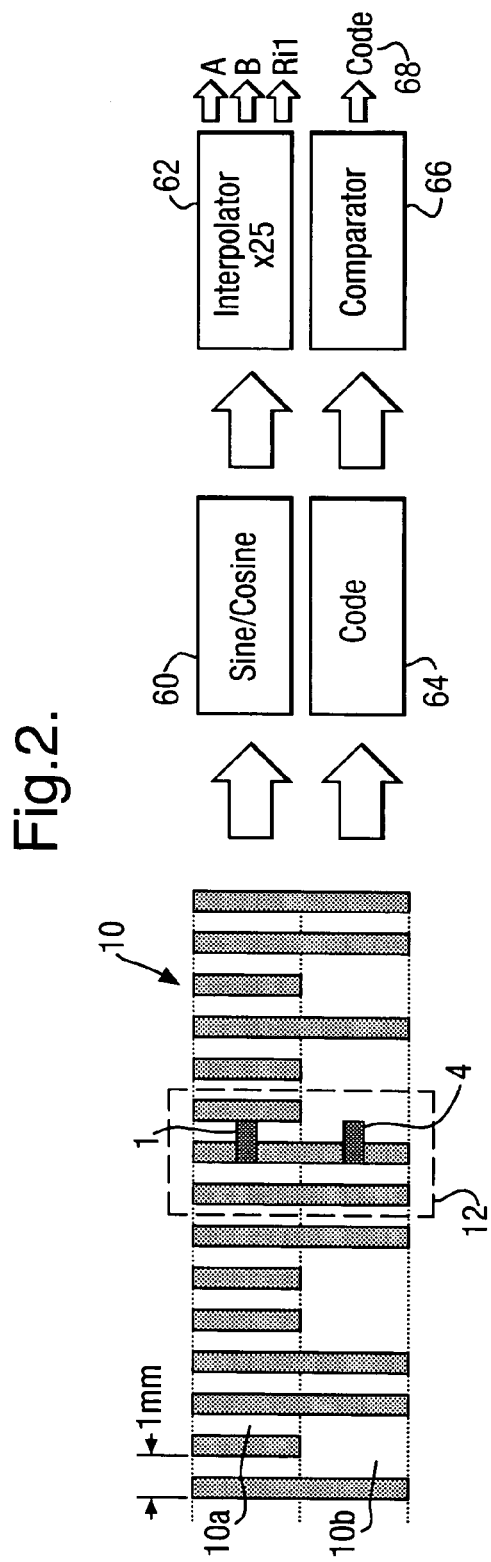
FIG. 2 is a schematic diagram of a second embodiment of an encoder.

Referring to FIG. 2, the scale 10 may be the same as in FIG. 1, including a track 10a with incremental scale marks, and a track 10b with reference marks in a pseudo-random code. For example, it may be the 8-bit code described previously.

A scale reader 12 contains a readhead or sensor 1 for the incremental track, which may be the same as in FIG. 1. This produces raw sine and cosine outputs 60 (shown in FIG. 3 and also schematically in FIG. 2) which are taken to an interpolator 62. The interpolator produces two digital quadrature signals A,B, which as shown in FIG. 2 have a frequency 25 times the raw sine and cosine signals 60. Since there are four zero crossing points in each period of the signals A,B, the interpolation factor is effectively 100. FIG. 2 numbers these interpolated positions from 0–100 for reference purposes.

In addition to the digital quadrature signals A,B, the interpolator 62 also produces a digital reference mark signal Ri1. As in the embodiment of FIG. 1, and shown in more detail in FIG. 3, the signal Ri1 is generated every period of the sine and cosine signals 60, at a time when the sine and cosine signals are equal and positive (the 45° position of the waveform).

The scale reader 12 also contains a sensor 4 for the code track 10b. This produces an analogue code-signal 64, which is squared up to a digital code signal 68 by a comparator 66.

As in the FIG. 1 embodiment, the sensor 4 may be identical to the sensor 1, but this is not essential.

Figure 3:
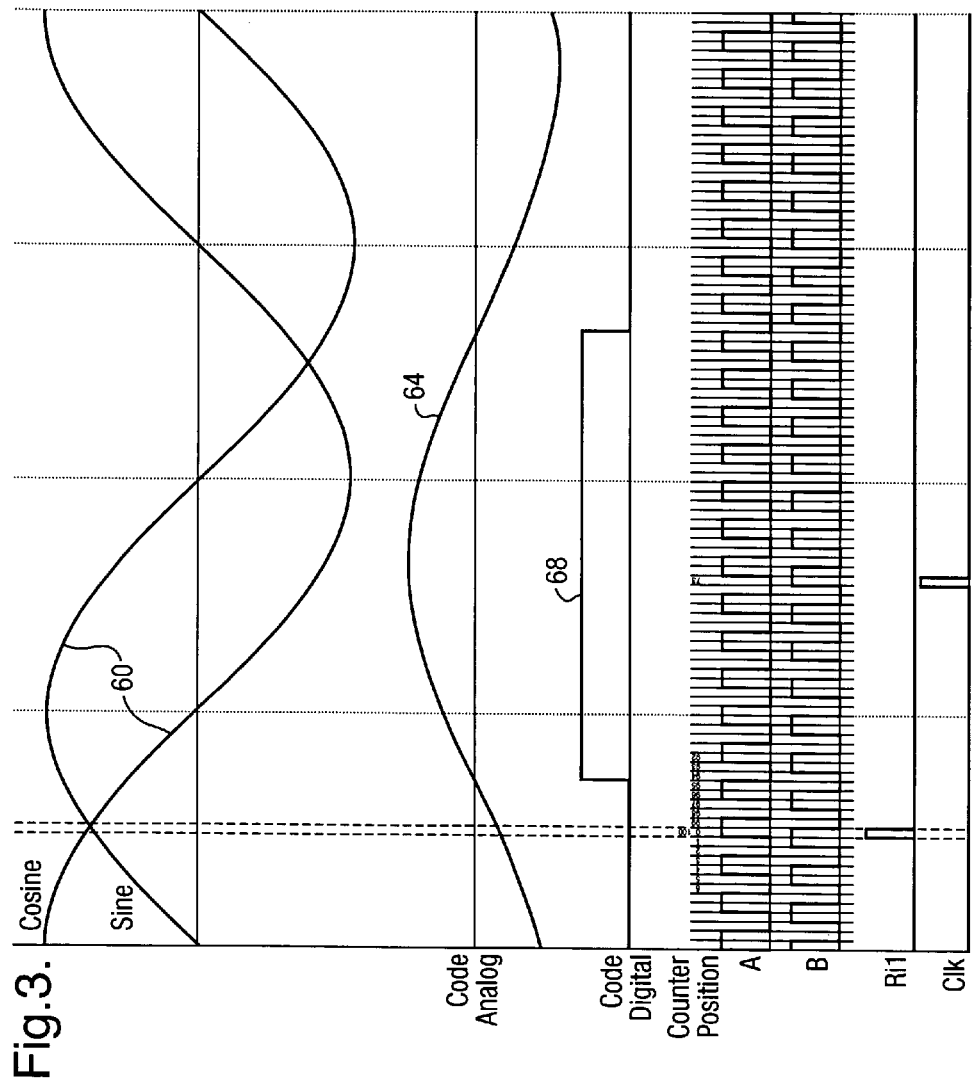
FIG. 3 is a waveform diagram showing the timing of signals in the second embodiment.

In FIG. 3, the digital code signal 68 is shown for a position in the code track 10b where the code value is 1. It will be understood that if the code value is 0, then the code signal 68 would be zero.

Figure 4:
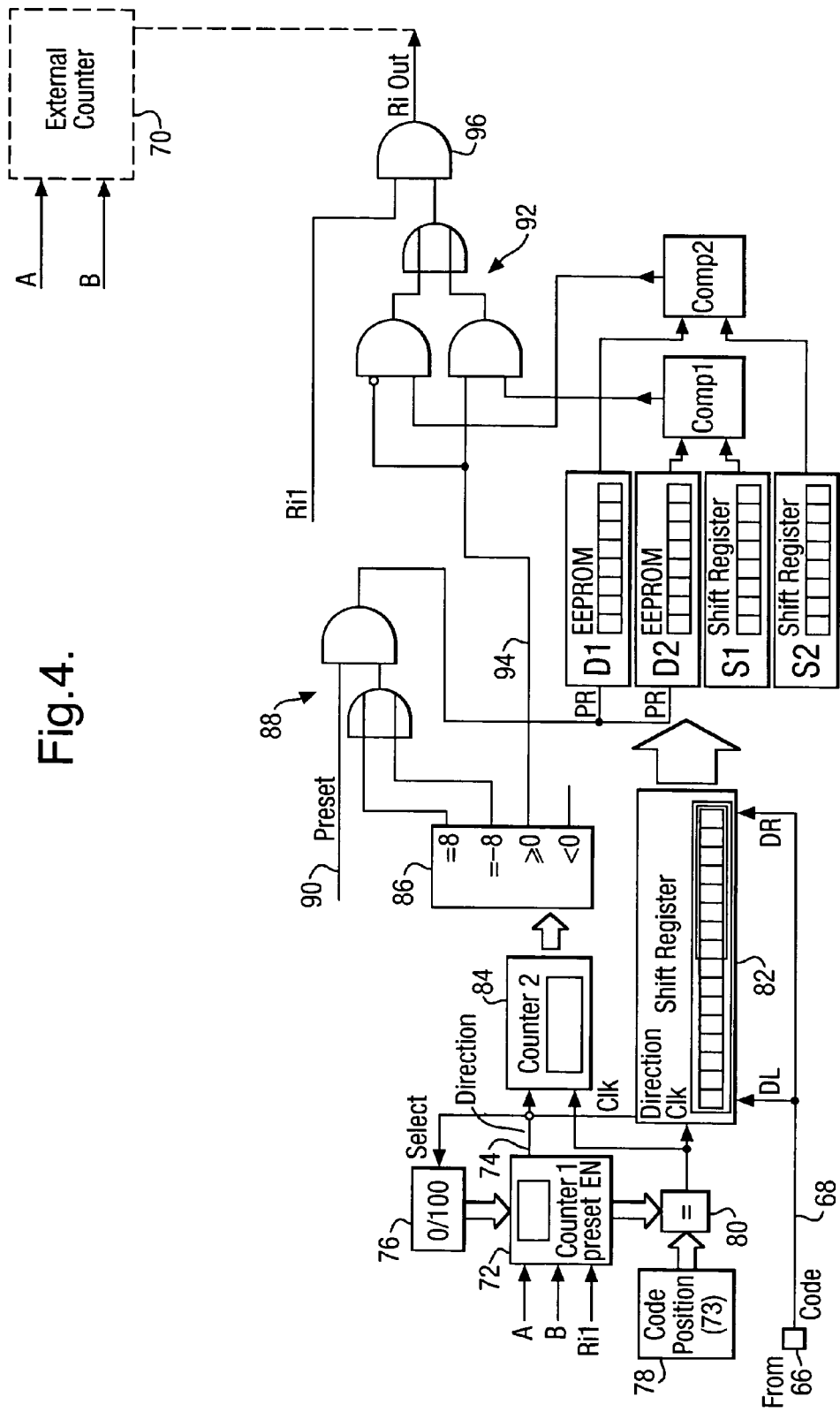
FIG. 4 is a more detailed schematic diagram of the second embodiment.

FIG. 4 shows the circuitry for producing an output reference mark signal Ri from the various signals shown in FIGS. 2 and 3. This reference mark signal Ri is generated at a position along the scale 10 which can be selected at will by the customer or user. In practice, the digital quadrature signals A,B and the selectable reference mark signal Ri are all taken to an external counter, shown at 70 in FIG. 4, but usually provided in practice in the customer's equipment to which the scale and scale reader are to be fitted. The external counter 70 counts the incremental signals A,B to provide an indication of the position of the scale reader relative to the scale. When it receives the reference mark signal Ri, the counter 70 is reset to zero or another preset value.

Apart from this external counter 70, the circuit of FIG. 4 includes a first counter 72 which receives the signals A,B and Ri1 of FIGS. 2 and 3. This counter counts up to a value of 100. It also determines the direction of travel of the scale reader along the scale, providing a direction signal on a line 74. When the signal Ri1 appears, the state of the counter 72 is set to a value of either 100 or 0, received from a selector circuit 76. The selector 76 chooses the value, 100 or 0, depending on the direction of travel as indicated on the line 74.

Thus, the counter 72 outputs an indication of the position within one cycle of the sine and cosine signal 60, in terms of the 100 interpolated values indicated for the digital quadrature signals A,B in FIG. 3.

The output of the first counter 72 is used to generate a clock signal Clk, seen in FIG. 3. This clock signal is used to sample the digital code signal 68. The clock signal should be generated at a position within the cycle which is most reliable for reading the information from the code track 10b. This is determined experimentally, since it depends on the positioning of the sensors 1,4 relative to each other. In the present example, the interpolated position number 73 within the cycle is used. Therefore, a value 73 is preset into a code position circuit 78. A digital comparator 80 compares the output of the counter 72 with the value from the code position circuit 78, generating the clock signal Clk when they are equal.

The values 68 of the pseudo-random code read from the code track 10b are fed from the comparator 66 (FIG. 2) into a bi-directional shift register 82. The size of the shift register is double that of the code size, i.e. 16 bits in the case of the present example of an 8-bit pseudo-random code. The pseudo-random code pattern 68 is fed simultaneously to both ends of the shift register, at inputs DL and DR. However, which of these is effective to load the pattern depends on the direction of travel as indicated on the line 74, which controls the shift direction of the shift register. At each pulse of the clock signal Clk, a new value from the code pattern is loaded into one or other end of the shift register, and the remaining pattern is shifted left or right, as the case might be.

It will be appreciated that, since there is only one sensor 4 for the code pattern, and since it is fed into the shift register at either end depending on the direction of travel, either the bottom half or the top half of the shift register will contain valid data representing the pattern of the code track. Thus, for the purposes of subsequent processing, the shift register is considered in two separate parts, S1 and S2. These are shown as separate boxes in FIG. 4, but it will be appreciated that this is merely for convenience in the following description. The box S1 represents the lowest 8 bits of the shift register (referred to as B0–B7 below) which are used when the scale reader is moving to the right. The box S2 represents 8 bits of data from the upper part of the shift register 82, used when the scale reader is moving to the left. However, it is not the topmost 8 bits, but is taken from a position one bit to the right (B7–B14 instead of B8–B15). This compensates for a hysteresis of one position (one bit) caused when the direction of travel changes.

A further counter 84 is used to determine the validity of data in the two halves of the shift register 82. The counter 84 counts pulses of the clock signal Clk. It counts up and down between a maximum value of 8 and a minimum value of –8, and it receives an input from the line 74 indicating the direction of travel. After counting up to the maximum value of 8, the next clock pulse causes it to roll around to –8 (and vice versa if the direction of travel is reversed).

On power up, all the data in the counters 72, 84 and the shift register 82 are zero. First, synchronisation must be established between the first counter 72 and the incremental scale track 10a. The counter 72 is disabled until the first pulse Ri1 is detected, which then enables that counter. After power up, the scale reader 12 must move for 16 mm in either direction before succeeding actions are enabled. This ensures that the shift register 82 is filled with data.

As in the FIG. 1 embodiment, the code value for the position of the reference mark selected by the customer or user is stored in an EEPROM. Like the shift register 82, this should be twice the size of the code value, and is considered as being split into two halves, D1 and D2. D1 contains the upper 8 bits B8-B15 of a code pattern while D2 contains the lower 8 bits B0–B7. It will be understood that for economy a single EEPROM will contain both halves D1 and D2, but they may be separate if required.

The customer or user stores a reference mark in the EEPROM D1,D2 as follows.

The output of the counter 84 is indicated in a box 86, and for the purpose of storing the code value in the EEPROM D1,D2 only output values 8 or –8 of the counter 84 are deemed valid. To store the value for a selected reference mark, the customer first moves the scale reader 12 to a desired position on the scale 10. He then provides an input on a line 90, for example using a push button With continuous movement of the scale reader in either direction for at least 16 mm, gates 88 then enable a preset input to the EEPROM D1,D2 at a time when the outputs 86 of the counter 84 have a value 8 or –8. The entire contents of the shift register 82 are then transferred into the corresponding bits of the EEPROM D1,D2.

During normal use of the encoder, it is required to provide the output Ri every time the position of the selected reference mark is passed, in either direction of travel. An output 94 of the counter 84 indicates whether the value stored in the counter (as indicated at 86) is positive (greater than or equal to zero) or negative (less than zero). This output 94 is used to enable and disable gating circuitry 92, to select either the output of a comparator Comp1 or Comp2. Comp1 compares the EEPROM data D2 with the shift register data S1, while Comp2 compares the EEPROM data D1 with the shift register data S2. When the enabled comparator Comp1 or Comp2 indicates that a match has been achieved (i.e. that the scale reader 12 is in the position of the selected reference mark) the output signal Ri is generated. It is gated in a gate 96 with the signal Ri1, to ensure a consistent pulse width of 10 micrometers as in FIG. 1.

The actual position of the reference value will be 8 mm (i.e. 8 bits at a pitch of 1 mm) back from the position when it was stored in the EEPROM D1,D2. The reason is as follows. We are using only one sensor to read the reference code track, and the EEPROM stores a value which is double the length of the reference code. When the system is operating, the upper part of the shift register is compared with the EEPROM data received from the lower part of the shift register when the data was stored (and vice versa). The above-noted shift in the position of the reference mark arises as a consequence.

With the example of an 8 bit code and a 1 mm pitch, it is possible to set a reference mark which is unique within 256 mm of scale. Codes with larger number of bits can be used to provide a unique reference mark in longer lengths of scale.

A particular advantage of the systems described is that the customer can select a reference mark within a very close distance of any desired position on the scale. This is a considerable improvement over prior art systems, e.g. of the type where each reference mark is provided with a unique selectable distance code, which unfortunately takes up space in the code track. Selection of the reference mark can be done entirely electronically, just by pushing a button, with no mechanical parts to be set up. Furthermore, since the reference code only repeats every 256 mm (for example) it is possible to provide arbitrary lengths of scale, of any length up to 256 mm. These can be cut off as required from a scale which is many meters long, provided as a reel of tape scale, without a large number of wasteful offcuts.

It would also be possible to provide a code with more bits, e.g. such that the reference code never repeats in 32 meters. Any desired length can then be cut off, either a very small length or a long length up to the full 32 meters.

The invention is useful for other types of scales in addition to the magnetic type described. For example, in an optical scale with a much smaller pitch than 1 mm, it would be necessary to use a code with more bits, to ensure that a reference mark code will be unique in a reasonably long length of scale. But it will still be possible to select a reference mark within a very close distance of any desired position on the scale. It is also possible to have a hybrid system, in which the incremental track is optical (for high resolution and accuracy) while the reference mark is provided magnetically as described above. Or another hybrid system might have an optical incremental track produced by laser ablation, with the reference code track produced by another optical technology.

An extension to the systems described would allow for multiple programmable reference marks at different positions along the scale. This merely requires a corresponding number of memories for the marks to be programmed, and comparators for each to compare the pattern values in the shift register. One use would be a system with two or more limit marks. A system without an incremental track could be used for a programmable safety system.

The invention has been described using linear scales as examples, but may also be used in a code disk of a rotary encoder, both for measuring over complete revolutions and in systems for measuring partial arcs.

Systems without a shift register can also be envisaged. For example, the code pattern could be read with a line camera which images multiple bits of the code pattern onto an array of sensor elements.

The invention claimed is:

1. An encoder comprising a scale and a scale reader;
   the scale having a plurality of reference marks spaced apart from each other;
   the scale reader including a sensor which reads the reference marks;
   characterized in that:
   the reference marks are arranged along the scale in a random or pseudo-random pattern;
   as the scale reader moves over the pattern of the reference marks, the pattern is continually compared with a previously stored pattern; and
   when the pattern of the reference marks matches the previously stored pattern, a reference signal is output.

2. An encoder according to claim 1, including a counter which indicates the position of the readhead along the scale, said reference signal being connected to an input of the counter to reset the counter to a preset value.

3. An encoder according to claim 1, including a shift register, wherein values representing the pattern of the reference marks are read into the shift register as the scale reader passes over the reference marks, and the pattern in the shift register is compared to the previously stored pattern.

4. An encoder according to claim 3, wherein said values are introduced into one end of the shift register, and shifted along the shift register synchronously with the passing of the scale reader over the reference marks.

5. An encoder according to claim 3, wherein said values may be introduced into either end of the shift register, depending upon the direction of travel of the scale reader along the scale.

6. An encoder according to claim 3, including a memory for holding said previously stored pattern, and a comparator which compares the pattern of the reference marks in the shift register with the previously stored pattern in the memory.

7. An encoder according to claim 6, including an input to the memory for storing said stored pattern therein, the pattern being received from the shift register.

8. An encoder according to claim 7, including a circuit for determining the validity of the pattern in the shift register, and preventing said input being stored in the memory if it is invalid.

9. An encoder according to claim 1, including a memory for holding said previously stored pattern, and a comparator which compares the pattern of the reference marks from the scale with the previously stored pattern in the memory.

10. An encoder according to claim 9, including an input to the memory for storing said stored pattern therein, the pattern being received from the scale reader as the scale reader passes over the reference marks.

11. An encoder comprising a scale and a scale reader;
    the scale having a series of incremental marks, and a plurality of reference marks spaced apart from each other;
    the scale reader including one or more sensors which read the incremental marks and produce an output therefrom, and which read the reference marks;
    characterized in that:
    the reference marks are arranged along the scale in a random or pseudo-random pattern;
    as the scale reader moves over the pattern of the reference marks, the pattern is continually compared with a previously stored pattern; and
    when the pattern of the reference marks matches the previously stored pattern, a reference signal is output.

* * * * *